US010193394B2

United States Patent
Norconk et al.

(10) Patent No.: US 10,193,394 B2
(45) Date of Patent: Jan. 29, 2019

(54) WIRELESS POWER RECEIVER SYSTEM

(71) Applicant: Philips IP Ventures B.V., Eindhoven (NL)

(72) Inventors: Matthew J. Norconk, Grand Rapids, MI (US); Colin J. Moore, Grand Rapids, MI (US); Joshua B. Taylor, Rockford, MI (US)

(73) Assignee: PHILIPS IP VENTURES B.V., Eindhoven (NL)

( * ) Notice: Subject to any disclaimer, the term of this patent is extended or adjusted under 35 U.S.C. 154(b) by 1084 days.

(21) Appl. No.: 14/370,357

(22) PCT Filed: Jan. 4, 2013

(86) PCT No.: PCT/US2013/020203
§ 371 (c)(1),
(2) Date: Jul. 2, 2014

(87) PCT Pub. No.: WO2013/103756
PCT Pub. Date: Jul. 11, 2013

(65) Prior Publication Data
US 2014/0368052 A1    Dec. 18, 2014

Related U.S. Application Data

(60) Provisional application No. 61/583,740, filed on Jan. 6, 2012.

(51) Int. Cl.
*H02J 5/00* (2016.01)
*H02J 50/40* (2016.01)
(Continued)

(52) U.S. Cl.
CPC ............ *H02J 50/40* (2016.02); *H02J 5/005* (2013.01); *H02J 7/025* (2013.01); *H02J 17/00* (2013.01);
(Continued)

(58) Field of Classification Search
CPC .... H02J 17/00; H02J 5/005; H02J 7/02; H02J 7/025; H02M 3/3384; H04B 5/0075; H04B 5/0037; H04B 5/0081; Y02B 70/1433
(Continued)

(56) References Cited

U.S. PATENT DOCUMENTS 645,576 A    3/1900  Telsa
685,012 A    10/1901 Tesla
(Continued)

FOREIGN PATENT DOCUMENTS

DE  10 2008 056927   6/2009
EP      2 306 617    4/2011
(Continued)

OTHER PUBLICATIONS

International Search Report and Written Opinion of the International Searching Authority for International Application No. PCT/US13/20203 dated Jun. 27, 2013.
(Continued)

*Primary Examiner* — Thienvu Tran
*Assistant Examiner* — Brian K Baxter
(74) *Attorney, Agent, or Firm* — Larry Liberchuk

(57) ABSTRACT

A wireless power receiver capable of receiving wireless power from close-coupled and mid-range wireless power supplies. The wireless power receiver includes a principal and supplemental receiver circuits. The principle receiver circuit is adjustable to operate in a close-coupled mode or a resonator mode. In close-coupled mode, the principle receiver circuit is coupled to the power input of a remote device and functions as the principle power source. In resonator-mode, the principle power circuit is electrically disconnected/isolated from the remote device and forms a closed resonant loop to function as a resonator that amplifies
(Continued)

an electromagnetic field from a mid-range wireless power supply. The supplemental receiver circuit is coupled to the power input of the remote device and is configured to receive wireless power from the resonator and function as the power source when the principle receiver circuit is in the resonator mode.

36 Claims, 7 Drawing Sheets

(51) Int. Cl.
*H02J 50/12* (2016.01)
*H02M 3/338* (2006.01)
*H02J 7/02* (2016.01)
*H02J 17/00* (2006.01)
*H04B 5/00* (2006.01)

(52) U.S. Cl.
CPC ........... *H02J 50/12* (2016.02); *H02M 3/3384* (2013.01); *H04B 5/0075* (2013.01); *H04B 5/0037* (2013.01); *H04B 5/0081* (2013.01); *Y02B 70/1433* (2013.01)

(58) Field of Classification Search
USPC ........................................................ 307/104
See application file for complete search history.

(56) References Cited

U.S. PATENT DOCUMENTS

| | | | |
|---|---|---|---|
| 4,802,080 | A | 1/1989 | Bossi et al. |
| 5,565,846 | A | 10/1996 | Geiszler et al. |
| 6,917,182 | B2 | 7/2005 | Burton et al. |
| 2002/0008973 | A1* | 1/2002 | Boys .................. F21S 8/032 362/307 |
| 2009/0015075 | A1 | 1/2009 | Cook et al. |
| 2009/0058189 | A1 | 3/2009 | Cook et al. |
| 2010/0052431 | A1 | 3/2010 | Mita |
| 2010/0109443 | A1 | 5/2010 | Cook et al. |
| 2010/0117454 | A1 | 5/2010 | Cook et al. |
| 2010/0182803 | A1* | 7/2010 | Nan .................. H02M 3/33592 363/21.02 |
| 2011/0095618 | A1 | 4/2011 | Schatz et al. |
| 2011/0115303 | A1* | 5/2011 | Baarman .................. H02J 17/00 307/104 |
| 2011/0133569 | A1* | 6/2011 | Cheon ..................... H02J 17/00 307/104 |
| 2011/0241436 | A1 | 10/2011 | Furukawa |
| 2011/0285349 | A1 | 11/2011 | Widmer et al. |
| 2011/0304216 | A1 | 12/2011 | Baarman |
| 2012/0280650 | A1* | 11/2012 | Kim ........................ H02J 17/00 320/108 |
| 2012/0281435 | A1* | 11/2012 | Schlenk ............ H02M 3/33592 363/21.02 |
| 2013/0294113 | A1* | 11/2013 | Liang .................. H02M 3/3382 363/20 |
| 2013/0300210 | A1* | 11/2013 | Hosotani ................ H02J 5/005 307/104 |

FOREIGN PATENT DOCUMENTS

| | | |
|---|---|---|
| EP | 2 345 553 | 7/2011 |
| EP | 2 369 711 | 9/2011 |
| EP | 2 412 560 | 2/2012 |
| JP | H08-340650 | 12/1996 |
| JP | 1997-326736 | 12/1997 |
| JP | 2000-270501 | 9/2000 |
| JP | 2011-029799 | 2/2011 |
| JP | 2011-109810 | 6/2011 |
| WO | 2009/054221 | 4/2009 |
| WO | 2010/041318 | 4/2010 |
| WO | 2010-116441 | 10/2010 |
| WO | 2010/126010 | 11/2010 |
| WO | 2011/156555 | 12/2011 |
| WO | 2012/058466 | 5/2012 |
| WO | 2013/103756 | 7/2013 |
| WO | 2013/103939 | 7/2013 |
| WO | 2013/112526 | 8/2013 |

OTHER PUBLICATIONS

Shen, F.Z., et al., "Circuit Analysis of Wireless Power Transfer by Coupled Magnetic Resonance", pp. 602-605.
Screen shots of YouTube video entitled, "eCoupled Wireless Power Through Granite", uploaded on Jun. 6, 2011, and available at https://www.youtube.com/watch?v=1Lvd4dMloEY.

\* cited by examiner

WIRELESS POWER RECEIVER SYSTEM

BACKGROUND OF THE INVENTION

The present invention relates to wireless power transfer, and more particularly to systems for wirelessly receiving power from a wireless power supply.

The use of wireless power supply systems continues to grow. The most common wireless power supply systems use electromagnetic fields to wirelessly transfer power from a wireless power supply to wireless power receiver associated with a remote device, such as a cell phone, a smart phone, a media player or other electronic device. There are a number of different types of wireless power supply systems. For example, many conventional systems use a primary coil in the wireless power supply and secondary coil in the wireless power receiver of the remote device. The primary coil generates an electromagnetic field that emanates from the wireless power supply. The wireless power receiver includes a secondary coil that can be placed within the electromagnetic field generated by the primary coil. When the remote device is placed within sufficient proximity to the wireless power supply, the electromagnetic field induces power within the secondary coil that can be used by the remote device, for example, to power and/or charge the remote device. These types of systems typically provide optimal performance when the primary coil and the secondary coil are relatively close to one another. For this reason, these types of systems are often referred to as "close-coupled" systems.

A number of conventional wireless power supply systems have been configured to efficiently provide power when the primary coil and the secondary coil are farther apart than normally acceptable for efficient use of close-coupled systems. Given that they can efficiently transfer power at distances greater than close-coupled systems, these types of wireless power transfer systems are often referred to as "mid-range" systems. A typical mid-range wireless power transfer system relies on technology disclosed over 100 years ago by Nicola Tesla (see for example, U.S. Pat. No. 685,012, which issued on Oct. 22, 1901). With a typical mid-range system, the power transfer system includes a pair of resonators that are arranged between or otherwise near the primary coil and the secondary coil. Each resonator is configured to include an inductor and a capacitor, and does not include any additional significant load. This keeps the impedance at the resonant frequency to a minimum which maximizes the resonating current between the capacitor and inductor. The current in the inductor, in turn, amplifies the wireless power signal induced within the resonator. Given their ability to amplify signals, the resonators can function as a bridge for extending the range of the wireless power supply system. In use, the primary coil generates an electromagnetic field that induces power in the first resonator, the first resonator generates an amplified electromagnetic field that induces power in the second resonator and the second resonator generates an amplified electromagnetic field that induces power in the secondary coil.

Although the use of resonators typically provides improved efficiency in mid-range environments, resonators can reduce efficiency when the wireless power supply and the remote device are too close. This places a practical limitation on the use of mid-range systems that incorporate resonators. Further, a wireless power supply with a resonator will typically not operate efficiently with a remote device that does not have a resonator (and vice-versa). As a result, it is typically necessary for the wireless power supply to be paired with a matched remote device.

SUMMARY OF THE INVENTION

The present invention provides a wireless power receiver capable of optimizing itself for receiving wireless power from different types of wireless power supplies. The wireless power receiver includes two receiver circuits that are configured for different operating parameters. In one embodiment, the wireless power receiver includes a principle receiver circuit and a supplemental receiver circuit. The principle receiver circuit is adjustable to operate in either a close-coupled mode or a resonator mode. In the close-coupled mode, the principle receiver circuit may function as the principle power source of the remote device. In the resonator mode, the principle power circuit may be electrically disconnected/isolated from the remote device and function as a resonator to amplify the received wireless power signal. The supplemental receiver circuit may be configured to function as the power source for the remote device when the principle receiver circuit is in the resonator mode. The supplemental receiver circuit may also be capable of providing power to the remote device when the principle receiver circuit is in close-coupled mode.

In one embodiment, the principle receiver circuit includes a receiver coil (or other inductor) and a receiver capacitor that form a tank circuit and are coupled to the power input of the remote device. The receiver coil and receiver capacitor may form a resonant tank circuit. The resonant tank circuit may be coupled to the power input through rectification circuitry, as well as appropriate filtering and conditioning circuitry. The principle receiver circuit includes a switch arranged to allow the resonant tank circuit to be selectively shorted, such that the resonant tank circuit is effectively electrically disconnected/isolated from the remote device power input and configured in a closed resonant loop to function as a resonator. In one embodiment, the switch includes an arrangement of two FETs coupled to a controller. The controller may be configured to close the FETs and short the resonant tank circuit when it is desirable for the principle receiver circuit to function in resonator mode.

In one embodiment the supplemental receiver circuit includes a receiver coil coupled to the power input of the remote device. The supplemental receiver coil may be electrically connected to the power input through rectification circuitry, as well as appropriate filtering and conditioning circuitry. The characteristics of the supplemental receiver coil may be selected so that the supplemental receiver coil is tuned to efficiently receive wireless power from the principle receiver circuit when the principle receiver circuit is in the resonator mode.

In one embodiment, the supplemental receiver circuit may also be adjustable to operate in either a close-coupled mode or a resonator mode. In this embodiment, the supplemental receiver may include a receiver capacitor that combines with the receiver inductor to form a tank circuit. The supplemental receiver may also include a switch for selecting shorting the tank circuit so that it forms a closed resonant loop. In the resonator mode, the supplemental receiver circuit may function as a resonator to amplify the received wireless power signal. The principle receiver circuit and the supplemental receiver circuit may be tuned different so that each operates more efficiently with different mid-range wireless power supplies.

In one embodiment, the principle receiver circuit may be provided with selectively variable capacitance and/or selectively variable inductance so that the circuit may be tuned to different wireless power transfer parameters. For example, the circuit may include a bank of capacitors and/or a bank of inductors, and a controller capable of selectively connecting the desired capacitance and/or desired inductance to the receiver circuit.

In one embodiment, the supplemental receiver circuit may be provided with selectively variable capacitance and/or selectively variable inductance so that the supplemental receiver circuit may be tuned to different wireless power transfer parameters. For example, the supplemental receiver circuit may include a bank of capacitors and/or a bank of inductors, and a controller capable of selectively connecting the desired capacitance and/or desired inductance to the receiver circuit. In some embodiments, both the principle receiver circuit and the supplemental receiver circuit may have selectively variable capacitance and inductance. In such embodiments, the system may include a single controller capable of controlling the capacitance and inductance of both receiver circuits.

In one embodiment, the wireless power receiver includes a communication system capable of receiving communications from a wireless power supply. In this embodiment, the wireless power receiver may receive communications indicating whether to operate in close-coupled mode or in mid-range mode. In mid-range mode, the wireless power receiver may include a controller that closes the FETs or other switch to cause the principle power receiver to operate as a resonator. In systems in which the principle receiver circuit and/or supplemental receiver circuit include variable capacitance and/or variable inductance, the communication system may also be used to communicate the desired capacitance and/or inductance, or to communication information indicative of the appropriate capacitance and/or inductance.

In one embodiment, the wireless power receiver may be configured to determine the proper operating mode without the need for communications from the wireless power supply. In one embodiment, the wireless power receiver may include a sensor capable of measuring the current and/or voltage induced in the principle receiver circuit and/or the supplemental receiver circuit. The wireless power receiver may include a controller capable of determining the proper mode of operation based on the current and/or voltage measured by the sensor. The controller may base the determination on different characteristics of the induced power, such as the peak or RMS value of the current and/or voltage, or the frequency at which the current and/or voltage varies. As another example, the determination may be made based on the rate of change in the current and/or voltage. The wireless power receiver may include a controller capable of comparing the current and/or voltage measured in the principle receiver circuit with the current and/or voltage measured in the supplemental receiver circuit, and determining the proper mode of operation from such comparison.

The present invention provides a simple and effective wireless power receiver that can receive power from different types of wireless power supplies. In one embodiment, a single power receiver can be selectively reconfigured to function as a close-range receiver or a resonator for a mid-range receiver. In one embodiment, the principle receiver circuit and the supplemental receiver circuit are both capable of functioning as resonators, thereby providing the wireless power receiver the ability to adapt to different mid-range wireless power supplies. In one embodiment, variable inductance and/or variable capacitance in the principle receiver circuit and/or supplemental receiver circuit can be used to allow the system to be tuned for improved efficiency over a wide range of wireless power supply operating characteristics. The present invention also provides a variety of alternative systems and methods for determining the proper operating mode. This allows the present invention to be easily incorporated into a variety of different wireless power supply systems.

These and other objects, advantages and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENT

Figure 1:
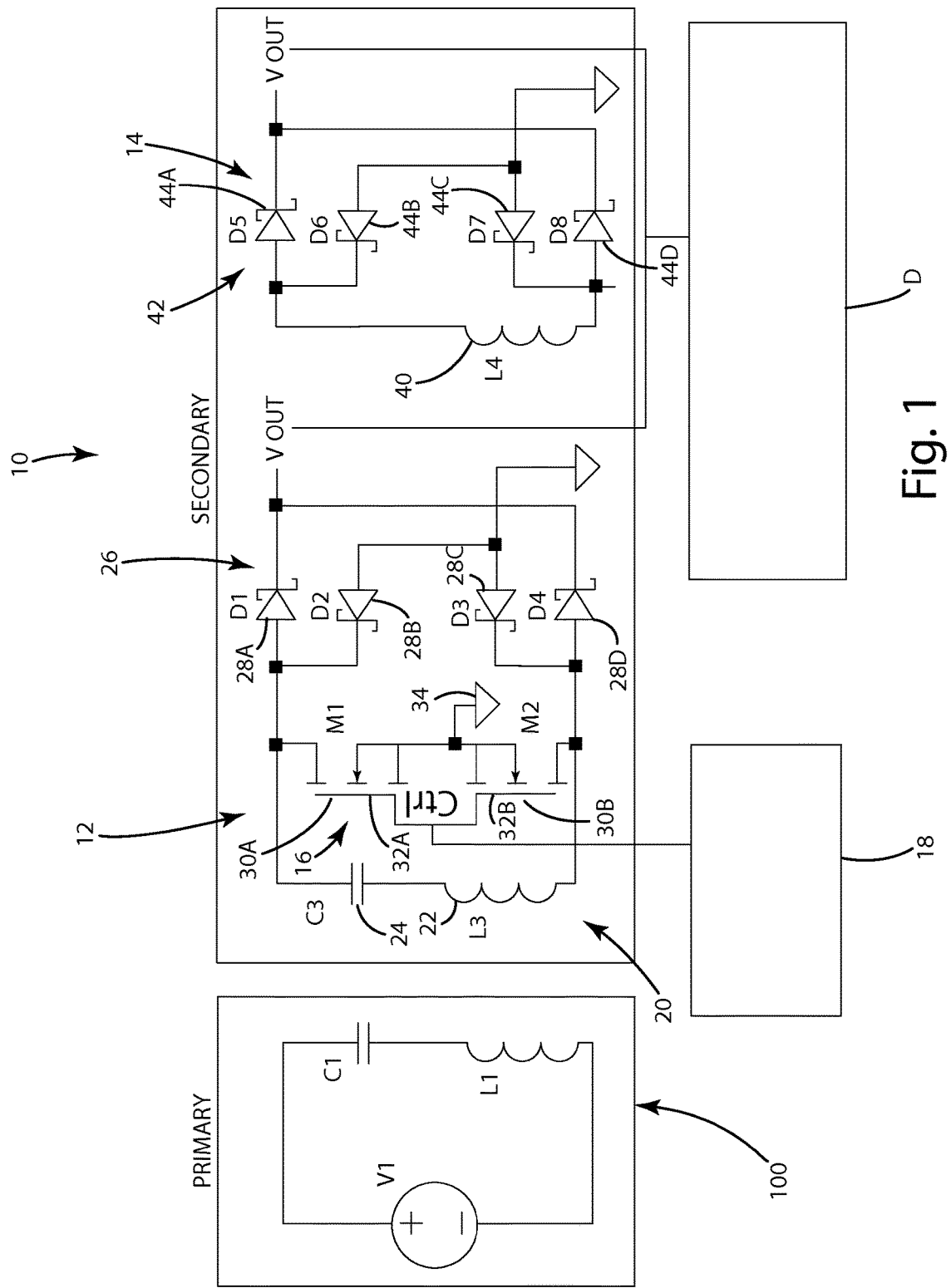
FIG. 1 is a schematic representation of a wireless power supply system having a close-coupled wireless power supply and a wireless power receiver in accordance with one embodiment of the present invention.
Figure 2:
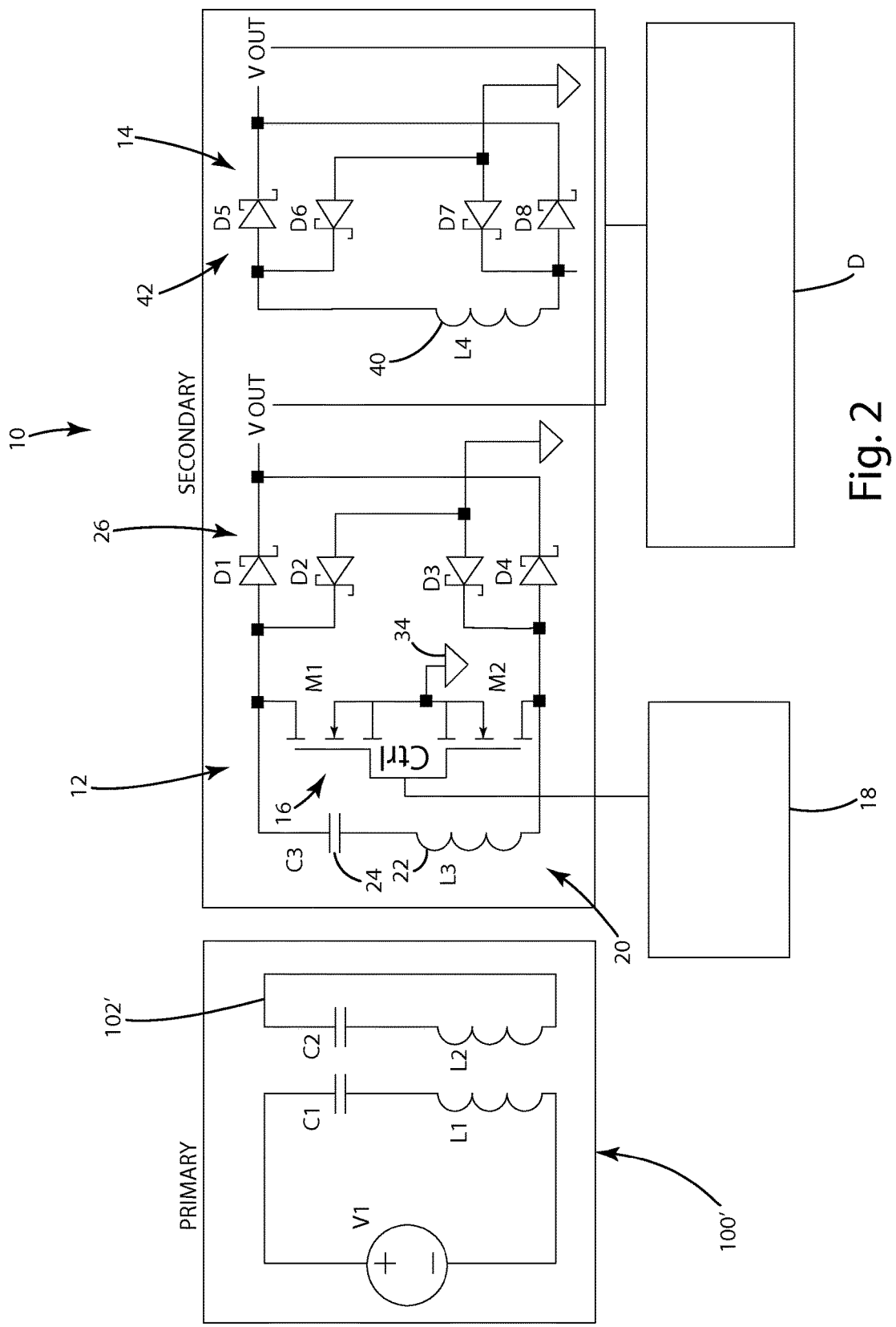
FIG. 2 is a schematic representation of a wireless power supply system having a mid-range wireless power supply and a wireless power receiver in accordance with one embodiment of the present invention.

A wireless power receiver in accordance with an embodiment of the present invention is shown in FIGS. 1 and 2. The wireless power receiver 10 of this embodiment is configured to wirelessly receive power from a close-coupled wireless power supply 100 (see FIG. 1) or from a mid-range wireless power supply 100' (see FIG. 2). The wireless power receiver 10 is coupled to a remote device D so that it can supply the wirelessly-received power to the remote device D. The wireless power receiver 10 is capable of selectively being reconfigured to operate in close-coupled mode or in mid-range mode to allow it to efficiently receive power from different types of wireless power supplies 100, 100'. The wireless power receiver 10 of this embodiment generally includes a principle receiver circuit 12, a supplemental receiver circuit 14 and a controller 18 for controlling operation of the wireless power receiver 10. In this embodiment, the principle receiver circuit 12 and the supplemental receiver circuit 14 are connected in parallel to a power input of a remote device D so that both of them are capable of delivering power to the remote device D. The principle receiver circuit 12 of this embodiment includes a resonant tank circuit and is capable of being selectively configured to operate as a close-coupled receiver or a resonator for mid-range power transfer systems. The principle receiver circuit 12 may be tuned for efficient operation as a receiver with a close-coupled wireless power supply 100 and for efficient operation as a resonator with a mid-range wireless power supply 100'. The supplemental receiver circuit 14 of this embodiment includes an inductor and is configured to efficiently receive wireless power from the principle receiver circuit 12 when the principle receiver circuit 12 is configured to operate as a resonator. In use, the controller 18 is capable of determining the proper operating mode and configuring the principle receiver circuit 12 to function as a close-coupled receiver or a resonator, as appropriate. The present invention discloses various systems and methods for determining the proper operating mode.

FIGS. 1 and 2 are schematic representations of a wireless power receiver 10 in accordance with one embodiment of the present invention. The wireless power receiver 10 of this embodiment may be coupled to a power input of a remote device D. The remote device D may be essentially any component that utilizes electrical power. For example, the remote device D may be a cell phone, a smart phone, a media player, a personal digital assistant, a laptop computer, a notebook or a tablet computer. The power delivered by the wireless power receiver 10 may be used in essentially any way, such as to directly power a remote device D and/or to charge a battery for the remote device D. The wireless power receiver 10 may be integrated directly into the remote device D by the manufacturer. In such embodiments, the remote device D may be configured to accommodate the wireless power receiver 10 within the housing of the remote device D and the power input may be internal electrical connections that deliver power from the wireless power receiver 10 to the power management unit (not shown) of the remote device D. The power management unit (not shown) may control use of the power as desired, for example, by using conventional power control algorithms to provide power to the remote device D or to charge the battery of the remote device D. Alternatively, the wireless power receiver 10 may be configured to attach to a remote device D that was not intended to wirelessly receive power to allow that remote device D to receive power wirelessly.

As noted above, the wireless power receiver 10 of FIG. 1 generally includes a principle receiver circuit 12, a supplemental receiver circuit 14 and a controller 18 for controlling operation of the wireless power receiver 10. The principle receiver circuit 12 and the supplemental receiver circuit 14 may be coupled to a power input of a remote device D so that both of them are capable of delivering power to the remote device D. In this embodiment, the principle receiver circuit 12 and the supplemental receiver circuit 14 are electrically connected in parallel to a power input of the remote device D. Although not shown, the two receiver circuits 12 and 14 may be connected in parallel to a power input of a power management unit (not shown) so that they may alternatively or simultaneously supply power to the remote device D through the power management unit. In this embodiment, the principle receiver circuit 12 includes a tank circuit 20 in which power is induced when in the presence of an appropriate electromagnetic field. The tank circuit 20 of this embodiment includes an inductor 22 and a capacitor 24. The inductor 22 may be a coil of wire, such as Litz wire, or other component capable of generating an electromagnetic field in response to the supply of electrical power. The capacitor 24 may be a conventional capacitor or other component having appropriate capacitance for the tank circuit 20. The tank circuit inductor 22 and the tank circuit capacitor 24 are selected with characteristics intended to tune the principle receiver circuit 12 to operate efficiently at the expected operating characteristics of a close-coupled wireless power supply 100. For example, the inductor 22 and the capacitor 24 may be selected to provide optimal performance at the power level and operating frequencies expected from the wireless power supply 100. This may involve varying essentially any relevant characteristic of the inductor, such as inductance value, coil shape, coil diameter, number of turns of wire, type of wire, gauge of wire, and/or of the capacitor, such as capacitance value and type of capacitor.

In some application, it may be desirable for a controller (or microcontroller) in the remote device D or the wireless power receiver to power up as quickly as possible For example, in some wireless power supply systems, the wireless power receiver or remote device D is expected to communicate with the wireless power supply 100, 100'. These communications may be used for various purposes, such as to ensure compatibility between the wireless power supply 100, 100' and the wireless power receiver 10 or to communicate information useful in setting the operating parameters of the wireless power supply 100, 100', wireless power receiver 10 or the remote device D. Failure of the wireless power receiver 10 or remote device D to communicate quickly enough may cause the wireless power supply 100, 100' to stop supplying power or otherwise adversely affect operation. In applications where it is important to ensure that a controller powers up as quickly as possible (for example, to exchange communications with the wireless power supply), it may be desirable to tune the tank circuit 20 of the principle receiver circuit 12 so that even when the principle receiver circuit 12 is in a close-coupled configuration, it induces enough power from a mid-range wireless power supply 100' to power up the controller. This may involve a trade-off in efficiency when operating with a close-coupled wireless power supply 100.

In this embodiment, the principle receiver circuit 12 is configured to provide rectified power to the remote device D. Accordingly, the tank circuit 20 is coupled to the power input of the remote device D through a rectifier. Although the rectifier may vary from application to application, the principle receiver circuit 12 of this embodiment includes a full-wave rectifier 26 having four diodes 28a-d arranged in two diode pairs. The type of rectifier (e.g. full-wave or half-wave) and the specific rectifier circuitry (e.g. bridge rectifier, center tap, diode bridge) may vary from application to application, as desired. In applications where the remote device D operates on AC power or has its own rectifier, the principle receiver circuit 12 may not include a rectifier. In applications where the remoted device D operates on AC power it may be desirable to include additional switches in the circuit to electrically disconnect/isolate the tank circuit 20 from the remote device D. If desired, the output of the rectifier 26 may be passed through filtering and/or conditioning circuitry, such as a smoothing circuit (not shown) configured to reduce ripples in the rectified power. For example, a reservoir capacitor or smoothing capacitor may be coupled to the output of the rectifier 26.

As discussed above, the wireless power receiver 10 is configured to selectively operate in close-coupled mode or in mid-range mode. In this embodiment, desired mode of operation is achieved by varying the configuration of the principle receiver circuit 12. In the embodiment of FIG. 1, the principle receiver circuit 12 is capable of being selectively configured to operate as a close-coupled receiver or as a resonator. To allow this reconfiguration, the principle receiver circuit 12 includes a switch 16 arranged so it can be closed to selectively short the tank circuit 20 to cause the tank circuit 20 to form a closed resonant loop. Although the configuration of the switch 16 may vary, the switch 16 of the illustrated embodiment includes two FETs 30*a-b* arranged on opposite sides of a reference 34, such as ground. Each FETs 30*a-b* includes a gate 32*a-b* that is electrically driven by controller 18 so that the FETs 30*a-b* may be opened and closed by the controller 18. Alternative types of switches may include arrangements of relays, transistors or triacs, or any other electrical components capable of providing a switching function in an AC circuit. When the switch 16 is open, the tank circuit 20 remains coupled to the power input of the remote device D through the rectifier 26. In this configuration, the principle receiver circuit 12 operates efficiently as a close coupled receiver. When the switch 16 is closed, the tank circuit 20 is shorted and effectively becomes electrically disconnected/isolated from the power input of the remote device D. In this configuration, the tank circuit 20 becomes a closed resonant loop and functions as a resonator capable of efficiently receiving, amplifying and retransmitting power from a mid-range wireless power supply. The resonator retransmits the power by generating an amplified electromagnetic field. The wireless power receiver 10 is tuned so that the amplified electromagnetic field produced by the resonator efficiently induces power in the supplemental receiver circuit 14.

As noted above, the wireless power receiver 10 of this embodiment includes a controller 18 configured to selectively switch the mode of operation of the wireless power receiver 10 between close-coupled mode and mid-range mode. The controller 18 is capable of controlling a drive signal applied to the gates 32*a-b* of FETs 30*a-b*. For example, the controller 18 may have a single output that drives both gates 32*a-b* or it may have a separate output for each gate 32*a-b*. Alternatively, the controller 18 may control intermediate components that apply the drive signal to the gates 32*a-b*. This alternative may be used when the output of the controller 18 is not sufficient to directly control the gates 32*a-b*. In some applications, the wireless power receiver 10 will have its own controller and, in other applications, the wireless power receiver 10 may share a controller with the remote device D. For example, in some applications, the controller 18 may be implemented in a controller that is part of the remote device D. In use, the controller 18 of this embodiment is capable of opening switch 16 to configure the principle receiver circuit 12 to operate in close-coupled mode or closing switch 16 to configure the principle receiver circuit 12 to operate as a resonator for mid-range mode. The wireless power receiver 10 may be configured to determine to proper mode of operation using a variety of different methods. In one embodiment, the wireless power receiver 10 may use communications with the wireless power supply 100, 100' to determine the operating mode. For example, the wireless power supply 100, 100' and the wireless power receiver 10 may both include wireless communication transceivers, such as Bluetooth, WiFi or NFC communication transceivers. The wireless power receiver 10 may use a communication system built into the remote device D or it may have a dedicated communication system of its own. In use, the wireless power receiver 10 may use the communication capability to ask the wireless power supply 100, 100' for the appropriate operating mode and the controller 18 may configure the principle receiver circuit 12 accordingly. As another example, the wireless power supply 100, 100' and the wireless power receiver 10 may be configured to communicate through the power transfer coils. In one embodiment of this example, the wireless power receiver 10 may be capable of receiving communications from the wireless power supply 100, 100' using backscatter modulation or essentially any other type of communication capable of being communicated through the power transfer coils.

The controller 18 may alternatively be capable of determining the proper operating mode through trial and error. For example, the controller 18 may operate for a first period of time in close-coupled mode and for a second period of time in mid-range mode, and may chose to operate in whichever mode proves preferable, such as the mode that provides the greatest amount of power to the remote device D.

As another alternative approach, the controller 18 may be capable of determining the proper operating mode by sensing one or more characteristics of the power received in the principle receiver circuit 12 and/or the supplemental receiver circuit 14. In one embodiment, the principle receiver circuit 12 includes a current sensor (not shown) capable of determining the magnitude of the current induced in the principle receiver circuit 12. The current sensor may be replaced by a voltage sensor. In some embodiments, the principle receiver circuit 12 may include both a current sensor and a voltage sensor. The controller 18 may evaluate different characteristics of the measured signals, such as the peak or RMS value of the current and/or voltage, the frequency at which the current and/or voltage varies or the rate of change in the current and/or voltage. A variety of current and voltage sensors are known to those skilled in the field. The controller 18 may be programmed to determine the correct operating mode based on the sensed value(s). For example, in an embodiment in which the principle receiver circuit 12 includes a current sensor, the controller 18 may compare the sensed current with predetermined values to determine if the wireless power receiver 10 should operate in close-coupled mode or in mid-range mode. As another example, in an embodiment in which the principle receiver circuit 12 and the supplemental receiver circuit 14 each include current sensors, voltage sensors or both, the controller 18 may compare the measurements taken by the two sensors to determine the appropriate operating mode.

As noted above, the supplemental receiver circuit 14 is also coupled to the power input of the remote device D. The supplemental receiver circuit 14 is tuned to efficiently induce power in the presence of an electromagnetic field generated by the principle receiver circuit 12 when it is configured to operate as a resonator. In this embodiment, the supplemental receiver circuit 14 includes an inductor 40 in which power is induced when in the presence of an appropriate electromagnetic field. The inductor 40 may be a coil of wire, such as Litz wire, or other component capable of generating an electromagnetic field in response to the supply of electrical power. The inductor 40 is selected with characteristics intended to tune the supplemental receiver circuit 14 to operate efficiently at the expected operating characteristics of a mid-range wireless power supply 100', which includes a resonator 102'. For example, the inductor 40 may be selected to efficiently induce maximum power when in the presence of the amplified electromagnetic field produced by the principle receiver circuit 12 operating in resonator mode. As with inductor 24, this may involve varying essentially any relevant characteristic of the inductor, such as inductance value, coil shape, coil diameter, number of turns of wire, type of wire, gauge of wire, and/or of the capacitor, such as capacitance value and type of capacitor.

In the illustrated embodiment, the supplemental receiver circuit 14 does not include a resonant capacitor, but a capacitor may be added to provide the supplemental receiver circuit 14 with a tank circuit, if desired. In this embodiment, the capacitor is excluded to allow the supplemental receiver circuit 14 to operate with increased efficiency over a broader range of frequencies. Generally speaking, the addition of a resonant capacitor may provide increased efficiency within a smaller range of operating frequencies, but may reduce efficiency outside of that range. Therefore, it may sometimes be desirable to add a resonant capacitor to the supplemental receiver circuit 14 when the wireless power supply can be reasonably expected to supply power within the efficiency range of the capacitor.

In this embodiment, the supplemental receiver circuit 14 is configured to provide rectified power to the remote device D. Accordingly, the inductor 40 is coupled to the power input of the remote device D through a rectifier. Although the rectifier may vary from application to application, the supplemental receiver circuit 14 of this embodiment includes a full-wave rectifier 42 having four diodes 44a-d arranged in two diode pairs. The type of rectifier (e.g. full-wave or half-wave) and the specific rectifier circuitry (e.g. bridge rectifier, center tap or diode bridge) may vary from application to application, as desired. In applications where the remote device D operates on AC power or has its own rectifier, the supplemental receiver circuit 14 may not include a rectifier. If desired, the output of the rectifier 42 may be passed through filtering and/or conditioning circuitry, such as a smoothing circuit (not shown) configured to reduce ripples in the rectified power. For example, a reservoir capacitor or smoothing capacitor may be coupled to the output of the rectifier 42.

Figure 3:
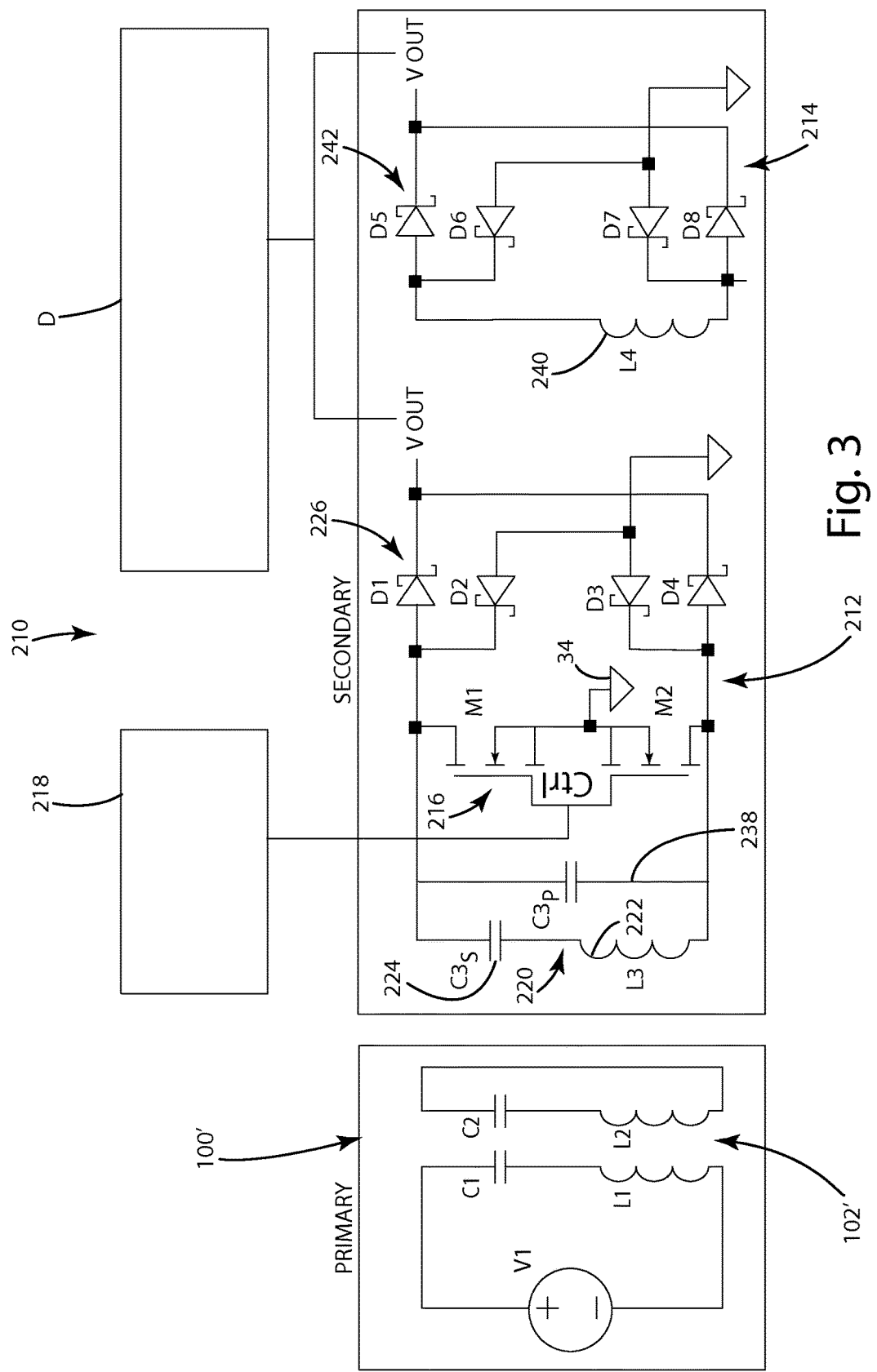
FIG. 3 is a schematic representation of a wireless power supply system having a mid-range wireless power supply and a wireless power receiver in accordance with a first alternative embodiment of the present invention.

In some applications, it may be desirable for the system to include an integrated identification capacitor that can be used to allow a wireless power supply to identify and/or verify the compatibility of the remote device. An alternative embodiment of the wireless power receiver 210 is shown in FIG. 3. Except as otherwise disclosed, the wireless power receiver 210 is generally identical to wireless power receiver 10, and certain components of wireless power receiver 210 are identified by the same reference numerals used with wireless power receiver 10, except preceded by a "2". In this alternative embodiment, the principle receiver circuit 212 includes an identification capacitor 238 arranged in parallel with the tank circuit 220. The value of the identification capacitor 238 may be selected to provide a resonant response at the desired frequency, such as 1 MHz for remote devices intended to be compliant with the Qi® interoperable wireless power standard.

Figure 4:
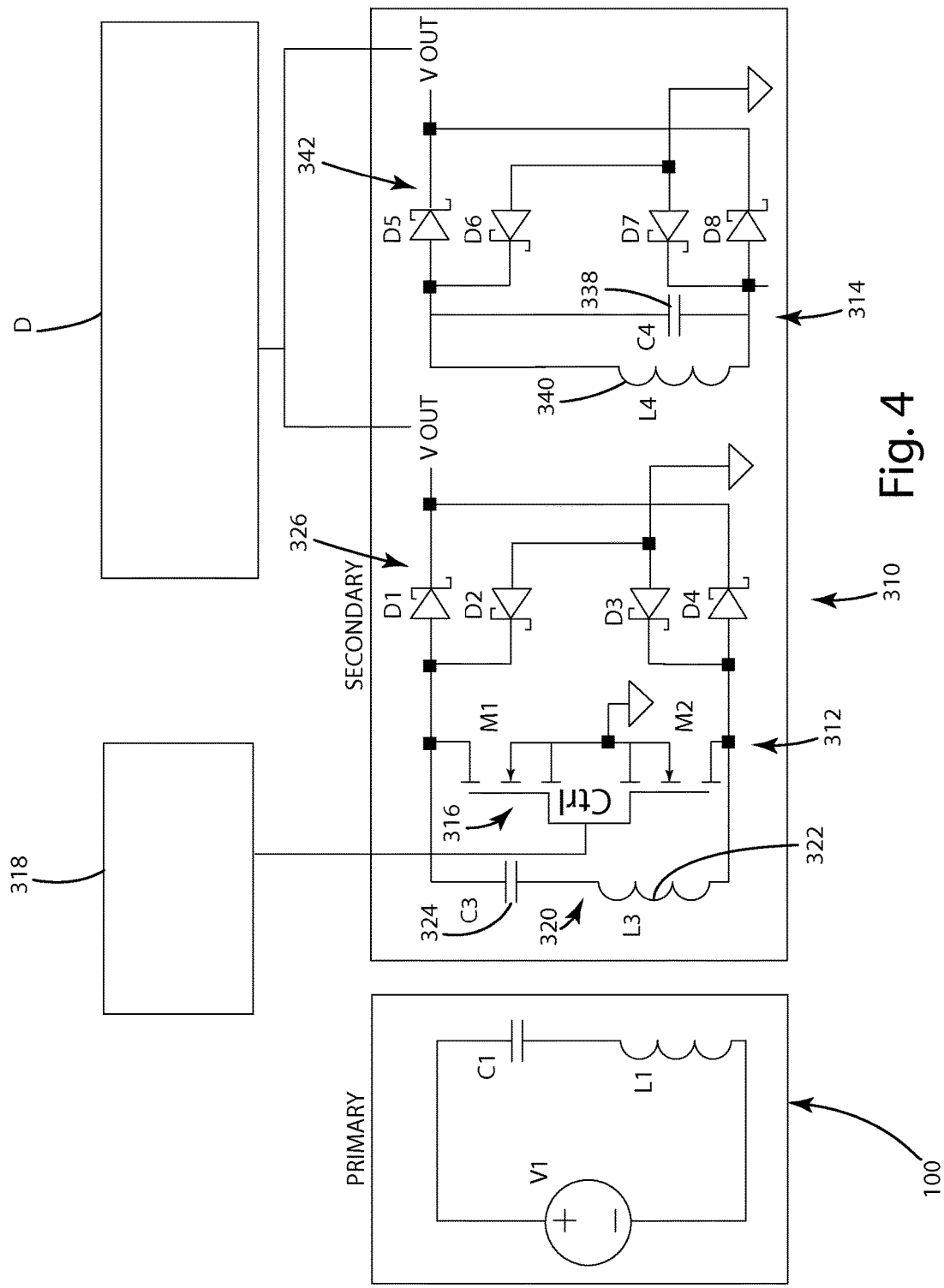
FIG. 4 is a schematic representation of a wireless power supply system having a close-coupled wireless power supply and a wireless power receiver in accordance with a second alternative embodiment of the present invention.

Although the wireless power receiver 210 of FIG. 3 includes the identification capacitor 238 in the principle receiver circuit 212, the identification capacitor 238 may be located elsewhere. FIG. 4 shows an alternative wireless power receiver 310 in which the identification capacitor 338 is integrated into the supplemental receiver circuit 314. For example, in the illustrated embodiment, the identification capacitor 338 is arranged in parallel with the inductor 340. In this embodiment, the series resonant capacitor 324 (i.e. the tank circuit capacitor in the principle receiver circuit 312) is separated from the parallel identification capacitor 338. Connecting these different capacitors to different coils may provide some advantages in the tuning of the circuit in some applications. Except as otherwise disclosed, the wireless power receiver 310 is generally identical to wireless power receiver 10, and certain components of wireless power receiver 310 are identified by the same reference numerals used with wireless power receiver 10, except preceded by a "3".

Figure 5:
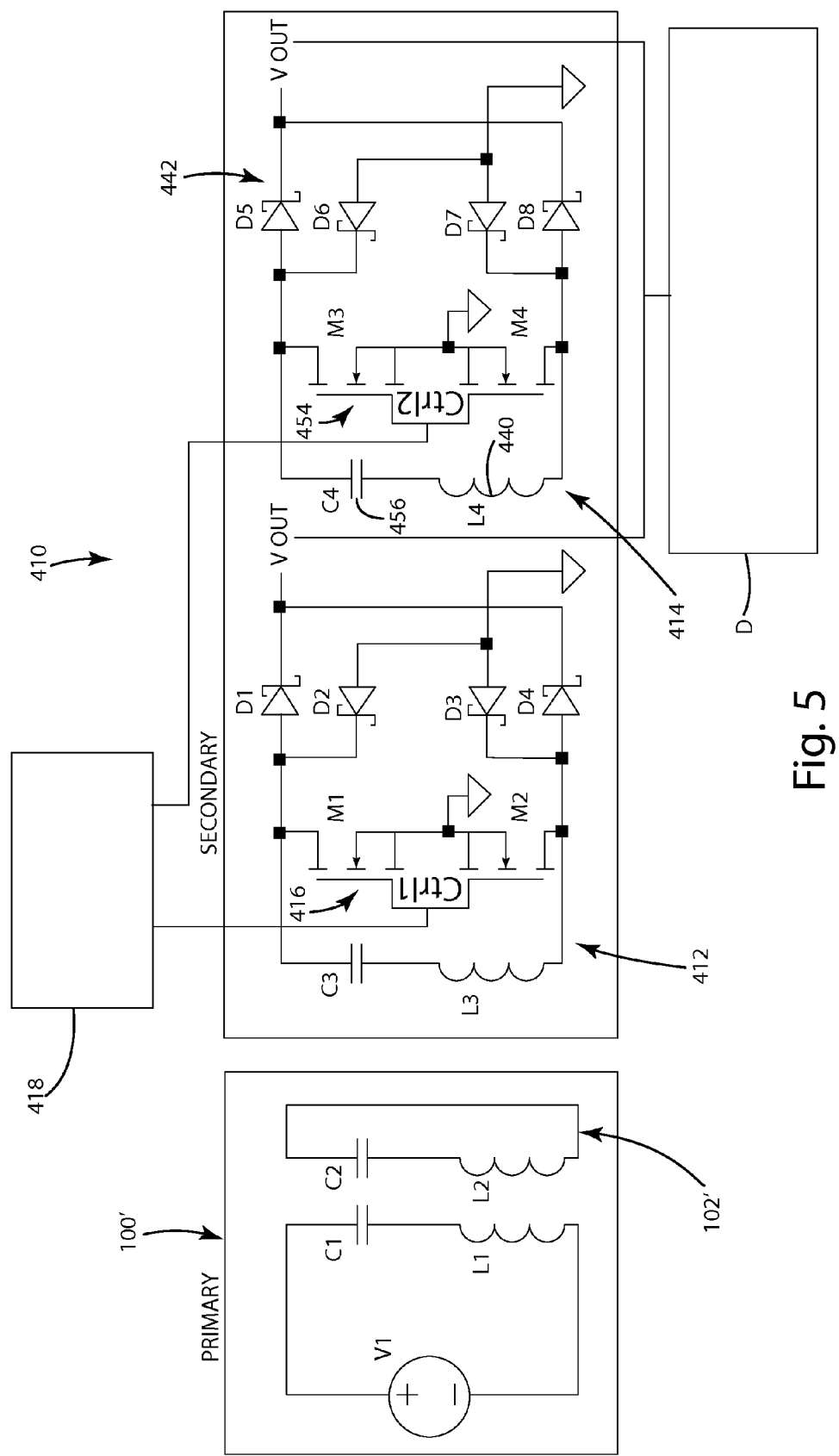
FIG. 5 is a schematic representation of a wireless power supply system having a mid-range wireless power supply and a wireless power receiver in accordance with a third alternative embodiment of the present invention.

The wireless power receiver 10 of FIG. 1 allowed two different modes of operation—one for close-coupled and one for mid-range power supplies. In some applications, it may be desirable to further enhance the adaptability of the wireless power receiver. FIG. 5 shows an alternative embodiment of the wireless power receiver 410 configured to provide additional adaptability. Except as otherwise disclosed, the wireless power receiver 410 is generally identical to wireless power receiver 10, and certain components of wireless power receiver 410 are identified by the same reference numerals used with wireless power receiver 10, except preceded by a "4". The wireless power supply 410 of FIG. 5 includes switches 416, 454 in both the principle receiver circuit 412 and the supplemental receiver circuit 414. In addition to switch 454, a series resonant capacitor 456 is also added to the supplemental receiver circuit 14. The extra switch 454 and capacitor 456 in the supplemental receiver circuit 414 enables additional modes of operation by allowing the supplemental receiver circuit 414, like the principle receiver circuit 412, to function as a resonator. For example, in this embodiment, both switches may remain open to allow the principle receiver circuit 412 and/or the supplemental receiver circuit 414 to receive power from a close-coupled wireless power supply, or one of the switches 416, 454 may be closed to allow the wireless power receiver 410 to efficiently receive power from a mid-range wireless power supply. In use, switch 416 may be closed to allow the principle receiver circuit 412 to operate as a resonator for the supplemental receiver circuit 414 or switch 454 may be closed to allow the supplemental receiver circuit 414 to operate a resonator for the principle receiver circuit 412. By proper tuning of the components of the principle receiver circuit 412 and the supplemental receiver circuit 414, the wireless power receiver 410 can be reconfigured to efficiently receive power from mid-range wireless power supplies with different operating characteristics. For example, the principle receiver circuit 412 may be configured to operate as an efficient resonator for a mid-range wireless power supply having a first power level and a first operating frequency, and the supplemental receiver circuit 414 may be configured to operate as an efficient resonator for a mid-range wireless power supply having a different power level and/or a different operating frequency.

The two switches 416, 454 may be controlled by controller 418. For example, the controller 418 may be capable of producing drive signals that selectively open or close the switches 416, 454 to implement the desired mode of operation. As with the embodiment of FIG. 1, the controller 418 may be capable of determining the appropriate mode of operation based on essentially any systems and methods. For example, the wireless power receiver 410 may determine the appropriate mode of operation based on communications with the wireless power supply, sequential testing of the different modes of operation or measurements of a characteristic of power in the principle receiver circuit 412 and/or the supplemental receiver circuit 414.

Figure 6:
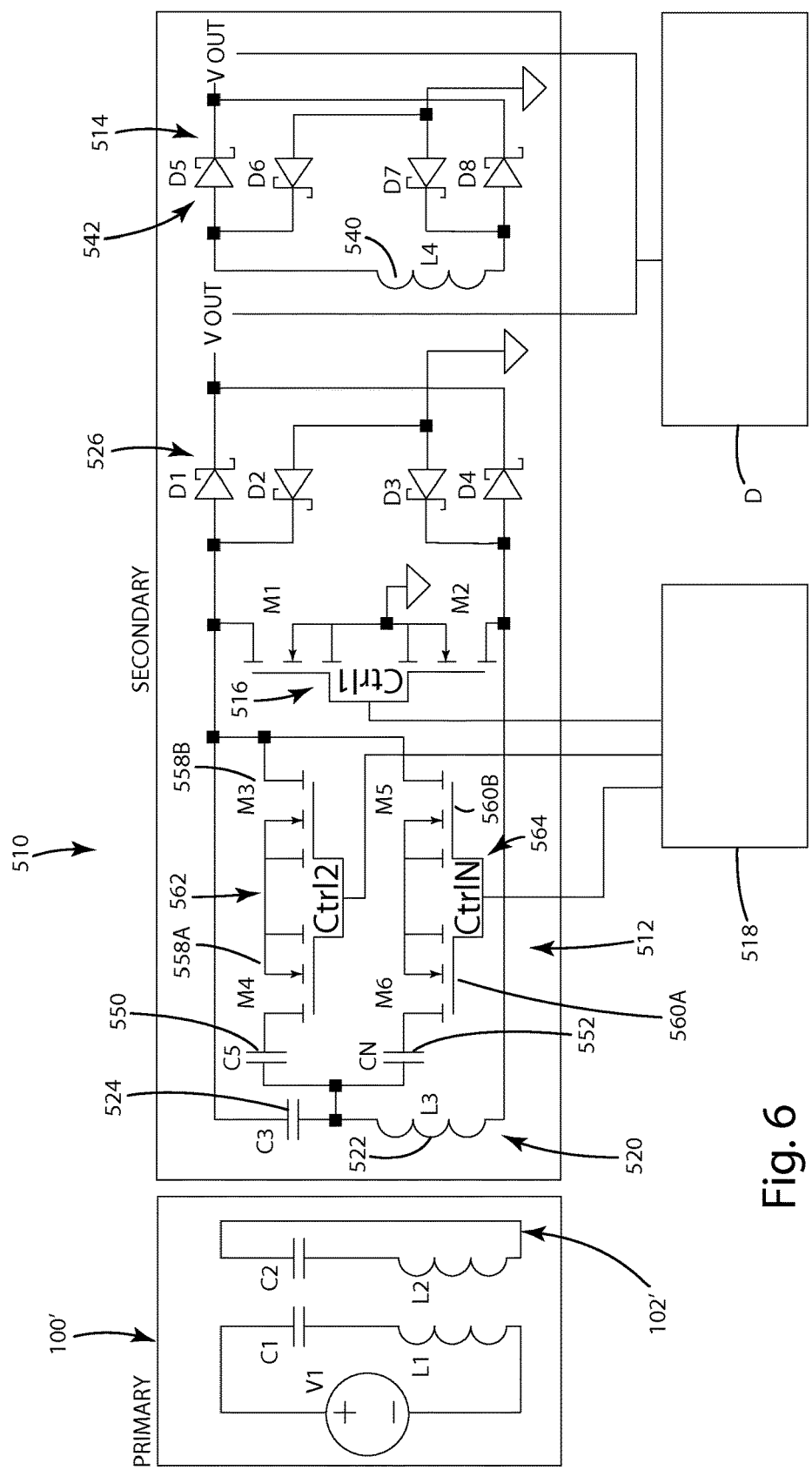
FIG. 6 is a schematic representation of a wireless power supply system having a mid-range wireless power supply and a wireless power receiver in accordance with a fourth alternative embodiment of the present invention.

In some applications it may be desirable to provide the wireless power receiver with additional tuning options. FIG. 6 shows an alternative wireless power receiver 510 in which the principle receiver circuit 512 includes optional capacitors 550, 552 that can be selectively switched into the circuit alone or in combination with one another. The additional capacitors 550, 552 may, among other things, allow the principle receiver circuit 512 to be tuned for different operating parameters. For example, the use of optional capacitors 550, 552 may be particularly useful in tuning the principle receiver circuit 512 to efficiently receive power from a wireless power supply operating at a fixed frequency. As another example, the optional capacitors 550, 552 may be used to de-tune the circuit when it is desirable to limit the amount of power received in the wireless power receiver 510. The optional capacitors 550, 552 may be connected in parallel with the tank circuit capacitor 524 and may include separate switches 562, 564. Although different types of switches may be used, each of the switches 562 and 564 may include a pair of back-to-back FETs 558*a-b*, 560*a-b* and necessary control circuitry. In this embodiment, the controller 518 may be configured to control the drive signals to the gates of the FETs 558*a-b* and 556*a-b* to open or close the switches 562, 564 as desired to switch optional capacitors 550, 552 in or out of the circuit. The controller 518 may be capable of determining the appropriate capacitance. For example, the controller 518 may determine the appropriate capacitance based on communications with the wireless power supply 100, 100', sequential testing of the system with different capacitance values or measurements of a characteristic of power in the principle receiver circuit 512 and/or the supplemental receiver circuit 514. Except as otherwise disclosed, the wireless power receiver 510 is generally identical to wireless power receiver 10, and certain components of wireless power receiver 510 are identified by the same reference numerals used with wireless power receiver 10, except preceded by a "5".

Although the illustrated embodiment includes two optional capacitors, the principle receiver circuit 512 may include any desired number of optional capacitors. Further, the illustrated embodiment shows optional capacitors in the principle receiver circuit 512. Additionally or in the alternative, optional capacitors can be added to the supplemental receiver circuit 514 to allow tuning of the supplemental receiver circuit 514. Also, the embodiment of FIG. 6 illustrates a system with adjustable capacitance. In some applications, it may be desirable to provide the principle receiver circuit 512 or the supplemental receiver circuit 514 with adjustable inductance. In such applications, the circuit may include optional coils or coil segments that can be switched into and out of the circuit as desired. In some embodiment, the circuit may include a single multi-tap coil and the different taps may be used to vary the inductance of the circuit. Adjustable inductance may be used alone or in combination with adjustable capacitance.

Figure 7:
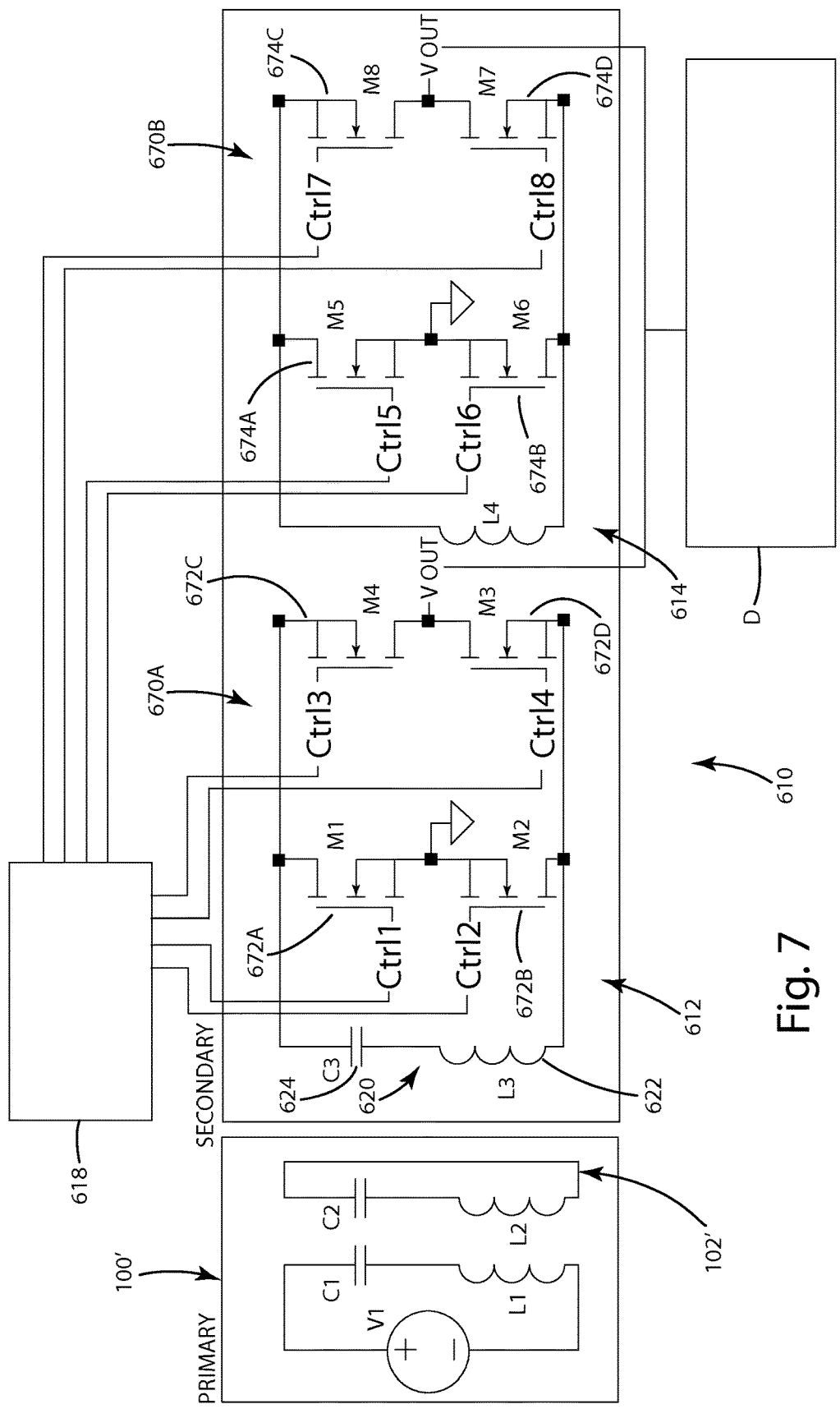
FIG. 7 is a schematic representation of a wireless power supply system having a mid-range wireless power supply and a wireless power receiver in accordance with a fifth alternative embodiment of the present invention.

The embodiments of FIGS. 1-6 each include a switch for selectively shorting the tank circuit to reconfigure the principle receiver circuit to function as resonator. In some applications, the principle receiver circuit may already include components that can provide the function of the switch. In such applications, a separate switch may not be required. For example, FIG. 7 shows an embodiment of the wireless power supply 610 in which the principle receiver circuit 612 and the supplemental receiver circuit 614 each include an active rectifier 670*a-b*. Except as otherwise disclosed, the wireless power receiver 610 is generally identical to wireless power receiver 10, and certain components of wireless power receiver 610 are identified by the same reference numerals used with wireless power receiver 10, except preceded by a "6". In this embodiment, the active rectifiers 670*a-b* are semi-synchronous rectifiers that include a series of switches 672*a-d* and 674*a-d*, such as FETs, that are normally driven in an appropriate sequence to rectify the AC power induced in the circuit. In this embodiment, the rectifier switches 672*a-d* in the principle receiver circuit 612 can be operated to short the tank circuit 620 and reconfigure the principle receiver circuit 612 to operate as a resonator. More specifically, the controller 618 may be configured to close switches 672*a* and 672*b* when it is desirable to reconfigure the principle receiver circuit 612 to operate as a resonator for the supplemental receiver circuit 614. Once closed, these switches 672*a* and 672*b* cause a closed resonant loop in the tank circuit 620 and essentially prevent power from flowing through switches 672*c* and 672*d* to the remote device D. Although illustrated in connection with the principle receiver circuit 612, this alternative approach may also be incorporated into the supplemental receiver circuit 614. For example, switches in the active rectifier 670*b* of the supplemental receiver circuit 614 may be operated by the controller 618 to allow the supplemental receiver circuit 614 to selectively function as a resonator.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A wireless power receiver, the wireless power receiver configured to receive wireless power from a wireless power supply, the wireless power receiver comprising:
   a power output for electrically coupling the wireless power receiver to a remote device;
   a principle receiver circuit having a tank circuit electrically coupled to said power output and a switch connected across opposite ends of said tank circuit;
   a supplemental receiver circuit having an inductor electrically coupled to said power output, wherein said principle receiver circuit and said supplemental receiver circuit are electrically coupled in parallel to said power output; and
   a controller configured to selectively operate said switch in an open mode in which power induced in said principle receiver circuit tank circuit by the wireless power supply is delivered to said power output via said electrical coupling between said principle receiver circuit and said power output and in a closed mode in which said switch creates a closed resonant loop in said principle receiver circuit tank circuit, whereby said principle receiver circuit functions as a resonator that inductively couples power induced in said principle receiver circuit tank circuit by the wireless power supply to said supplemental receiver circuit, which delivers power to said power output via said electrical coupling between said supplemental receiver circuit and said power output;
   wherein said principle receiver circuit, said supplemental receiver circuit, and said controller are located remote from the wireless power supply.

2. The wireless power receiver of claim 1 wherein said tank circuit includes an inductor and a capacitor, said inductor and said capacitor selected to efficiently coupling with a close-coupled wireless power supply when said switch is in said open mode.

3. The wireless power receiver of claim 1 wherein said inductor and said capacitor are selected to efficiently couple with a mid-range wireless power supply when said switch is in said closed mode.

4. The wireless power receiver of claim 1 wherein said supplemental receiver includes a capacitor selected to efficiently couple to said closed resonant loop when said switch is in said closed mode.

5. The wireless power receiver of claim 1 wherein said switch includes a pair of field-effect transistors arranged in series on opposite sides of a reference.

6. The wireless power receiver of claim 1 wherein said principle receiver circuit includes a rectifier.

7. The wireless power receiver of claim 1 wherein said supplemental receiver circuit includes a rectifier.

8. The wireless power receiver of claim 1 wherein said supplemental receiver circuit includes a capacitor, said supplemental receiver circuit inductor and said supplemental receiver circuit capacitor forming a tank circuit, said supplemental receiver circuit including a switch connected across opposite ends of said tank circuit.

9. The wireless power receiver of claim 8 wherein said controller is configured to selectively operate said supplemental receiver circuit switch in an open mode in which power induced in said supplemental receiver circuit tank circuit is delivered to said power output and in a closed mode in which said switch creates a closed resonant loop in said supplemental receiver circuit tank circuit, whereby said supplemental receiver circuit functions as a resonator.

10. The wireless power receiver of claim 1 wherein at least one of said principle receiver circuit and said supplemental receiver circuit includes an optional capacitor.

11. The wireless power receiver of claim 1 wherein at least one of said principle receiver circuit and said supplemental receiver circuit includes an optional inductor.

12. The wireless power receiver of claim 1 wherein said principle receiver circuit includes an active rectifier having a plurality of rectification switches, said principle receiver circuit switch including at least two of said rectification switches; and
   wherein said controller is configured to selectively operate at least two of said rectification switches to create a closed resonant loop in said tank circuit.

13. The wireless power receiver of claim 1 wherein the controller is located on the wireless power receiver.

14. The wireless power receiver of claim 1 wherein the controller is located remote from the wireless power receiver and remote from the wireless power supply.

15. A wireless power receiver, the wireless power receiver configured to receive wireless power from a wireless power supply being at least one of close-coupled and mid-range, the wireless power receiver comprising:
   a power output for electrically coupling the wireless power receiver to a remote device;
   a first receiver circuit having a tank circuit, said first circuit having a close-coupled configuration in which said tank circuit is electrically coupled to said power output and a resonator configuration in which said tank circuit is effectively electrically disconnected/isolated from said power output and forms a closed resonant loop; and
   a second receiver circuit having an inductor electrically coupled to said power output, said second receiver circuit configured to couple with said closed resonant loop, wherein said first receiver circuit and said second receiver circuit are electrically coupled in parallel to said power output;
   wherein said first receiver circuit and said second receiver circuit are located remote from the wireless power supply.

16. The receiver of claim 15 wherein said first receiver circuit includes a switch connected across opposite ends of said tank circuit, said switch being selectively closable to cause said tank circuit to form said closed resonant loop.

17. The receiver of claim 16 further including a controller configured to selectively operate said switch.

18. The receiver of claim 17 wherein said switch includes a pair of field-effect transistors arranged in series on opposites sides of a reference.

19. The receiver of claim 16 wherein said first receiver circuit includes an active rectifier having a plurality of rectification switches, said first receiver circuit switch including at least two of said rectification switches; and
   wherein said controller is configured to selectively operate at least two of said rectification switches to create a closed resonant loop in said first receiver circuit tank circuit.

20. The receiver of claim 15 wherein said first receiver circuit includes a rectifier.

21. The receiver of claim 15 wherein said second receiver circuit includes a rectifier.

22. The receiver of claim 15 wherein said second receiver circuit further includes a capacitor, said second receiver circuit inductor and said second receiver circuit capacitor forming a tank circuit, said second receiver circuit having a close-coupled configuration in which said second receiver circuit tank circuit is coupled to a power output and a resonator configuration in which said second receiver circuit tank circuit is electrically disconnected/isolated from said power output and forms a closed resonant loop.

23. The receiver of claim 22 wherein said second receiver circuit includes a switch connected across opposite ends of said second receiver circuit tank circuit.

24. The receiver of claim 23 wherein said controller is configured to selectively operate said second receiver circuit switch.

25. The receiver of claim 15 wherein said first receiver circuit includes an optional capacitor.

26. The receiver of claim 15 wherein said first receiver circuit includes an optional inductor.

27. The wireless power receiver of claim 15 wherein the controller is located on the wireless power receiver.

28. The wireless power receiver of claim 15 wherein the controller is located remote from the wireless power receiver and remote from the wireless power supply.

29. A method for operating a wireless power receiver, the wireless power receiver configured to receive wireless power from a wireless power supply, the method comprising the steps of:
    providing a power output for electrically coupling the wireless power receiver to a remote device;
    providing a first receiver circuit remote from the wireless power supply, the first receiver circuit capable of being configured to operate as a power supply circuit in close-coupled mode and as a resonator in mid-range mode;
    providing a second receiver circuit remote from the wireless power supply, the second receiver circuit capable of operating as a power supply circuit in mid-range mode, the second receiver circuit tuned to efficiently couple with the first receiver circuit when the first receiver circuit is configured to operate as the resonator, wherein said first receiver circuit and said second receiver circuit are electrically coupled in parallel to the power output;
    determining whether a wireless power supply is a close-coupled wireless power supply or a mid-range wireless power supply;
    upon a determination that the wireless power supply is a close-coupled wireless power supply, configuring the first receiver circuit to operate as a power supply circuit; and
    upon a determination that the wireless power supply is a mid-range wireless power supply, configuring the first receiver circuit to operate as a resonator.

30. The method of claim 29 wherein said step of providing a first receiver circuit includes providing said first receiver circuit with a tank circuit and a switch adapted to selectively short the tank circuit into a closed resonant loop; and
    wherein said step of configuring the first receiver circuit to operate as a power supply circuit includes opening said switch.

31. The method of claim 29 wherein said step of providing a first receiver circuit includes providing said first receiver circuit with a tank circuit and a switch adapted to selectively short the tank circuit into a closed resonant loop; and
    wherein said step of configuring the first receiver circuit to operate as a resonator includes closing said switch.

32. The method of claim 31 wherein the switch includes a pair of field-effect transistors.

33. The method of claim 31 wherein the first receiver circuit includes an optional capacitor; and
    further including the step of selectively switching the optional capacitor into the first receiver circuit.

34. The method of claim 31 wherein said determining step includes:
    obtaining a wireless communication from a wireless power supply indicative of whether the wireless power supply is a close-coupled wireless power supply or a mid-range wireless power supply; and
    determining whether the wireless power supply is a close-coupled wireless power supply or a mid-range wireless power supply as a function of the communication.

35. The method of claim 31 wherein said determining step includes:
    measuring a characteristic of power in at least one of the first receiver circuit and the second receiver circuit; and
    determining whether the wireless power supply is a close-coupled wireless power supply or a mid-range wireless power supply as a function of the measured characteristic.

36. The method of claim 31 wherein said determining step includes:
    measuring a characteristic of power in the first receiver circuit;
    measuring a characteristic of power in the second receiver circuit; and
    determining whether the wireless power supply is a close-coupled wireless power supply or a mid-range wireless power supply as a function of the measured characteristics.

* * * * *